April 27, 1965  S. WILDHEIM ETAL  3,180,499
APPARATUS FOR REMOVING ARTICLES FROM PALLETS
Filed April 12, 1962  6 Sheets-Sheet 1

INVENTORS
SVEN WILDHEIM
FORREST W. HYDE
ERNEST V. HART

BY Teller, McCormick, Paulding & Huber
ATTORNEYS

April 27, 1965 S. WILDHEIM ETAL 3,180,499
APPARATUS FOR REMOVING ARTICLES FROM PALLETS
Filed April 12, 1962 6 Sheets-Sheet 3

FIG_4

FIG_5

United States Patent Office 3,180,499
Patented Apr. 27, 1965

3,180,499
APPARATUS FOR REMOVING ARTICLES FROM PALLETS
Sven Wildheim, Hartford, Forrest W. Hyde, Avon, and Ernest V. Hart, Windsor, Conn., assignors to Emhart Corporation, Bloomfield, Conn., a corporation of Connecticut
Filed Apr. 12, 1962, Ser. No. 187,019
8 Claims. (Cl. 214—8.5)

This invention relates to a method and apparatus for unloading articles from a carrier and, more particularly, for removing articles that are stacked on a pallet. Accordingly, the apparatus of this invention may be referred to as a depalletizer and the operation may be called depalletizing.

It is the general object of the invention to provide a method and a substantially automatic apparatus for unloading a pallet which is stacked with articles in tiers so that the articles can be handled in a substantially continuously advancing line or lines.

It is a further object of the invention to provide apparatus for the aforesaid purpose and which will convey loaded pallets to a designated position for unloading and then remove the empty pallets therefrom.

It is a still further and specific object of the invention to provide apparatus for the purposes mentioned and which is so constructed and arranged that it can be used to great advantage in the handling of articles of glassware without damage thereto but which will nonetheless handle and move such articles automatically and at high speed.

In keeping with these objects of the invention, the method to be followed in unloading stacked glassware from a pallet includes as an important early step the supporting of the pallet so that the upper tier of glassware thereon will be disposed adjacent a horizontal platform or deadplate. Then, the said upper tier is pushed onto the platform by engaging the rear row in the tier and moving the entire tier in a direction normal to its parallel rows. Then, with the tier located on the platform, it is advanced still farther in the same general direction in increments of movement so that the rows of glassware making up the tier will be thrust off the platform successively. A conveyor is utilized to receive the glassware thrust off the platform and to convey it away from the platform and from in front of the advancing tier by movement in a direction generally parallel to the rows in the tier.

In the operation of this method by a substantially automatic apparatus, an elevator is provided to raise the loaded pallet to a position where its upper tier is adjacent the platform. Then, a pusher bar is operated to thrust the upper tier onto the platform as described, and the pusher bar is returned to its original position to work upon the next tier when the pallet is again elevated. In addition, a sweep bar is driven in intermittent movement so as to engage the tier and move it across the platform. The increments of movement of the sweep bar and tier are of such extent as to thrust a selected number of rows from the platform or deadplate with each increment of movement. Thus, one or more rows of the glassware or other articles will reach the take-away conveyor, and control means for the sweep bar drive is provided to prevent an increment of movement of the tier on the deadplate until the articles already thrust therefrom have been moved by the conveyor so as to clear the tier on the deadplate. The control means mentioned for this purpose includes a switch engageable by the articles on the conveyor until such time as the articles have been removed from in front of the tier, and then the switch operates to effect an advance of the sweep bar.

The apparatus which has just been described, and which will be described in greater detail hereinafter, is capable of operation at high rates of speed while lining the articles up on the conveyor for advance in a substantially continuous row. This rapid, substantially continuous movement of the articles is especially desirable in the handling of glass containers which can be moved by the conveyor from the apparatus of this invention to filling devices, washing apparatus, or the like.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

*The general mechanical arrangement*

While the depalletizer provided in accordance with the present invention can be employed advantageously to handle many different articles, it can be used to particular advantage in unloading articles of glassware such as glass containers G, G from a pallet P. Such containers are preferably arranged in horizontal tiers stacked upon the pallet, the said tiers being separated by paper sheets or chipboards C, C and each tier being made up of a plurality of parallel rows of the glassware articles. While the glassware articles in each tier are formed into rows which extend longitudinally and also transversely of the depalletizing machine, references to the rows herein will be to the transversely extending parallel rows.

As shown in the various views of the drawings, the depalletizing machine includes a cabinet-like frame 10 which has an opening in its rear end to accommodate movement into the frame of a loaded pallet P which is carried on a conveyor 12. The pallet conveyor 12 is driven by an electric motor 14, and as will be seen, the said motor operates to drive the conveyor only when the depalletizing machine is ready to receive a loaded pallet and to discharge an empty pallet on a conveyor 16 which extends forwardly of the cabinet frame 10.

A loaded pallet P is advanced by the conveyor 12 until it is positioned over an elevator 18 which can be moved from a position adjacent the bottom of the frame 10 upwardly therein. The bottom position for the elevator 18 is one that permits a loaded pallet to move over it to engage and depress a switch actuator 20 and to engage a stop 22.

Figures 1, 3:
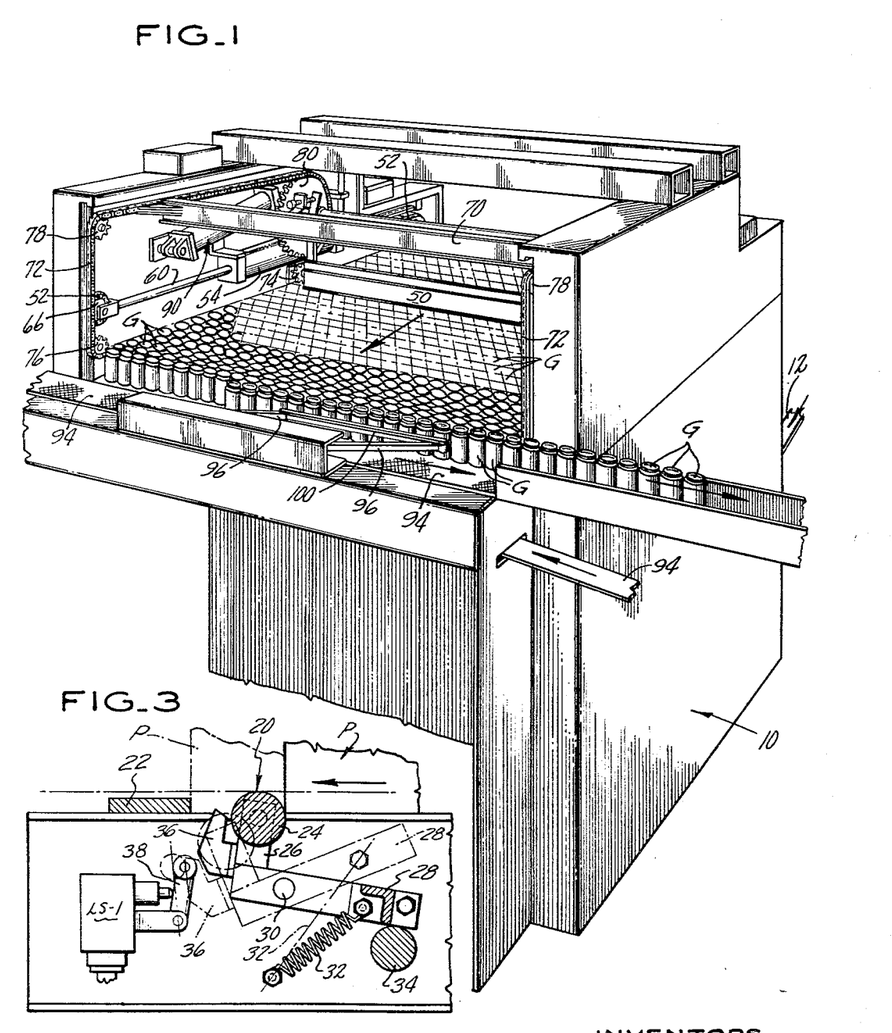
FIG. 1 is a perspective view of the depalletizing apparatus or machine provided in accordance with the present invention.
FIG. 3 is a detail view of an actuator for a switch which forms a part of the control means for the pallet conveyor and pallet elevator.
Figure 2:
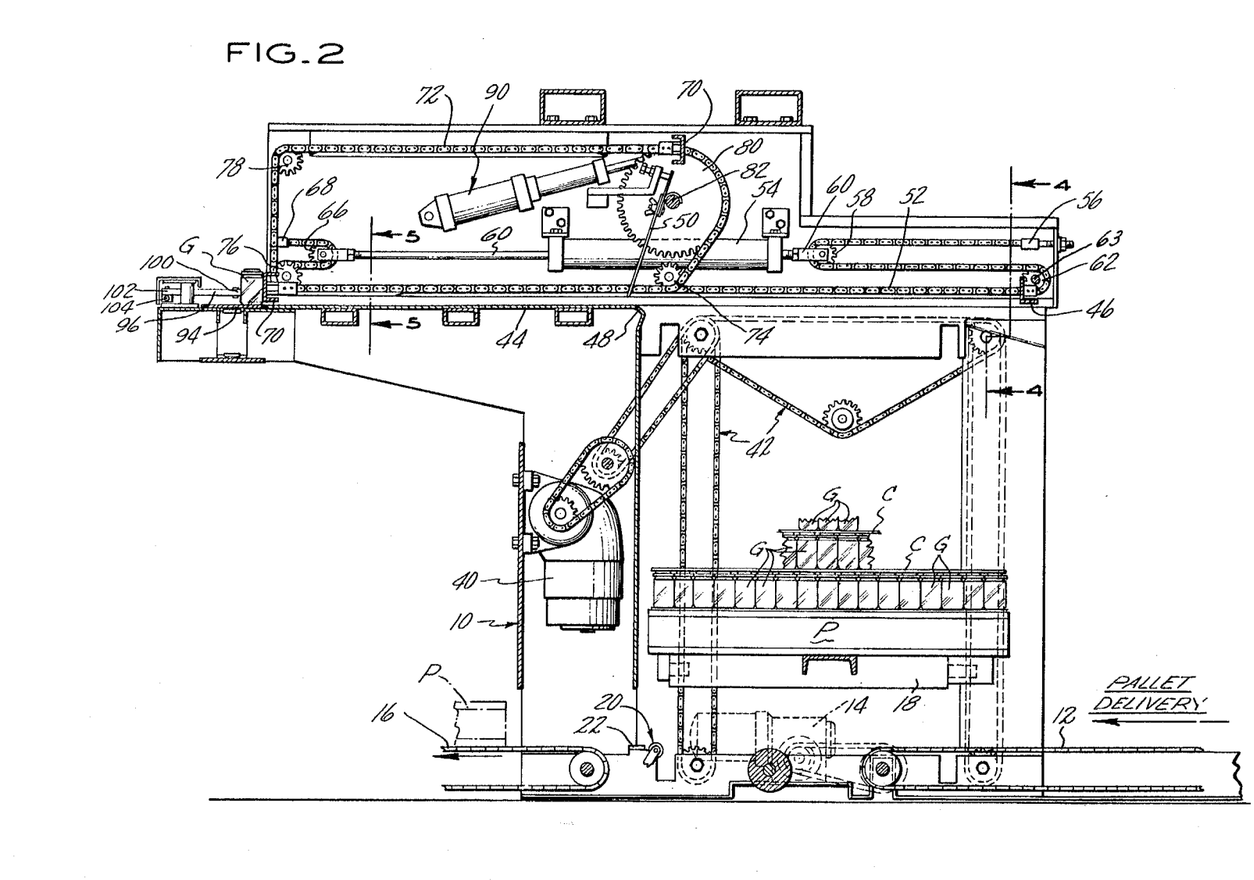
FIG. 2 is a vertical sectional view taken on a longitudinal plane through the machine.
Figure 4:
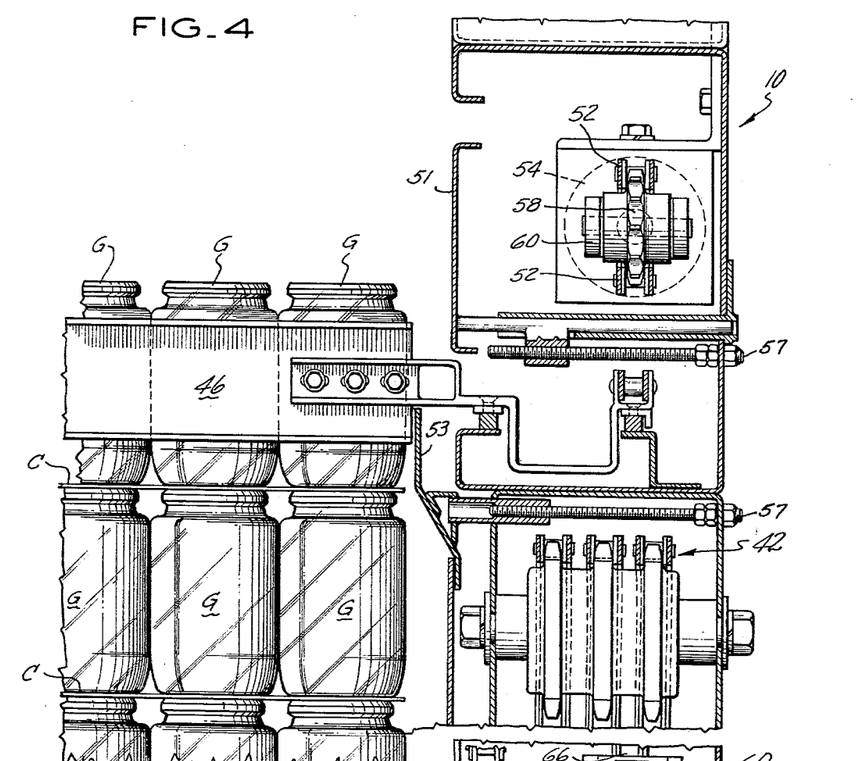
FIG. 4 is an enlarged transverse sectional view taken as indicated by the line 4—4 of FIG. 2.

The switch actuator 20 of FIGS. 2 and 3 is constructed and arranged to be depressed by the weight of a loaded pallet, but it is also constructed and arranged so as not to be depressed when similarly engaged by an empty pallet. As best shown in FIG. 3, the actuator 20 includes a roller 24 which will be engaged by a pallet P being moved by the delivery conveyor 12 into position over the elevator 18. The roller 24 is supported at the end of an upwardly projecting leg 26 on an L-shaped member having a second leg 28. The said L-shaped member is pivotally supported at 30 and it is biased by a tension spring 32 into position where its leg 28 engages a stop 34 wherein the roller 20 on the leg 26 is projected upwardly for engagement by a pallet P. When a loaded pallet does engage the roller 24, it will pivot the L-shaped member to the broken line position shown in FIG. 3.

In the said broken line position, a cam member 36 carried on the leg 26 engages a switch operating arm 38 for a limit switch LS–1. As will be described in more detail hereinafter, the limit switch LS–1, when engaged and operated by the actuator 20 as described, functions to de-energize the pallet conveyor motor 14 and to energize a reversible elevator motor 40 (FIG. 2) for raising the elevator.

The elevator motor 40 is connected through the chain and sprocket motion transmitting means indicated generally by the reference numeral 42 to raise and to lower the elevator 18 depending upon the direction of operation of the said motor. When initially raising the pallet P, the elevator moves upwardly until the upper tier of glassware on the pallet is disposed adjacent a platform or deadplate 44. When the elevator is raised to a position wherein the bottom of the upper tier is in the plane of the deadplate, switch means is operated to de-energize the elevator motor 40.

At this time, a pusher bar 46 is moved from its retracted position shown in FIG. 2, and in being moved from its retracted to its advanced position, it engages the rear row of articles in the upper tier and pushes said upper tier off its chipboard and onto the deadplate 44. In being moved from the pallet onto the deadplate, the articles of glassware are prevented from toppling by engagement with a beveled edge 48 on the deadplate, the tops of the glassware articles being steadied by engaging a transversely extending curtain 50 which is adjustably supported at its ends at the side walls of the frame 10. The glassware is further supported in rectangular tiers on the pallet and on the deadplate by side bars and plates 51, 53 and 55 which are adjustable by means of lead screws 57, 57 (FIGS. 4 and 5) and are supported from the side wall of the frame 10.

The transversely extending pusher bar 46 is generally L-shaped when viewed in cross-section and it is held at its ends in a pair of chains, one such chain 52 being supported along a side wall of the frame as is shown in FIG. 2. The pusher bar is reciprocated by chain movement between its advanced and retracted positions, and this is accomplished by a double-acting air cylinder 54 supported at one side wall of the frame 10 so as to be associated with the chain 52. As will be seen from FIG. 2, one end 56 of the chain 52 is secured to an end wall of the frame and the chain then passes around a sprocket 58 connected to one end of the piston rod 60 movable by the double-acting air cylinder 54. The chain then extends around a sprocket 62 secured adjacent the said end wall of the frame on a shaft 63 which rotates a sprocket adjacent the other side wall to drive the other chain. The chain 52 then extends from the sprocket 62 throughout the length of the frame to another sprocket 64, passing around this sprocket and a sprocket 66 on the other end of the piston rod 60 so that the other end of the chain 68 can be secured to the other end wall of the frame. Therefore, as the air cylinder 54 is operated to move its piston rod 60 toward the left as viewed in FIG. 2, the pusher bar 46 will be moved to its retracted position. When the air cylinder is reversed, the piston rods are moved toward the right to shift the chain 52 so that the pusher bar 46 will be moved toward and into its advanced position. As will be described, the pusher bar is retracted immediately after it has moved a tier of the articles off the pallet and onto the deadplate 44.

Figure 6:
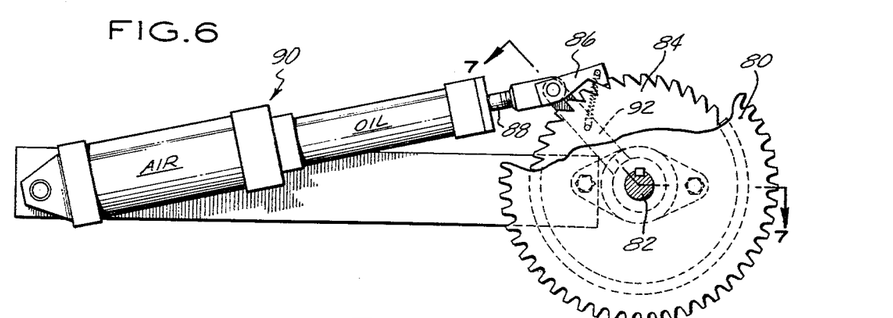
FIG. 6 is a view of the ratchet drive for the sweep bar employed in the machine.

The tier of glass containers on the platform or deadplate 44 are moved along the said deadplate in increments of movement by one of a pair of sweep bars 70, 70 which engage the last row of articles in the tier similarly to the pusher bar. Here again, the sweep bars are supported at their ends on a pair of chains, one such chain 72 being shown in FIG. 2. Each such chain is endless and extends over three idler sprockets 74, 76 and 78 which are mounted on shafts supported in the adjacent side wall of the frame 10, and each such chain extends over a large driven sprocket 80 mounted on a shaft 82 near the associated side wall. The shaft 82 and sprocket 80 are rotated in increments with a ratchet 84 (FIG. 6) which is fastened to the sprocket 80 and engaged by a pawl 86 on the end of a piston rod 88. The rod 88 is connected to a piston which is reciprocated by an air cylinder 90, the end of the rod 88 being pivotally connected to a link 92 which is pivotally supported on the shaft 82. As the piston rod is thrust outwardly, the ratchet 84 and a pair of sprockets 80 are rotated clockwise to advance the two sweep bars 70, 70 on the chains 72 an increment of movement.

As will be more fully described, the fluid motor 90 is operated to provide full strokes of the piston 88 to advance the sweep bars in large increments of movement until one such sweep bar engages the rear row of articles on the deadplate. Thereafter, the said motor is reciprocated to provide lesser increments for the sweep bar, the increments being of predetermined length so that the articles of glassware will be thrust off the deadplate one row at a time or two or more rows at a time as desired.

Figures 7, 8, 9:
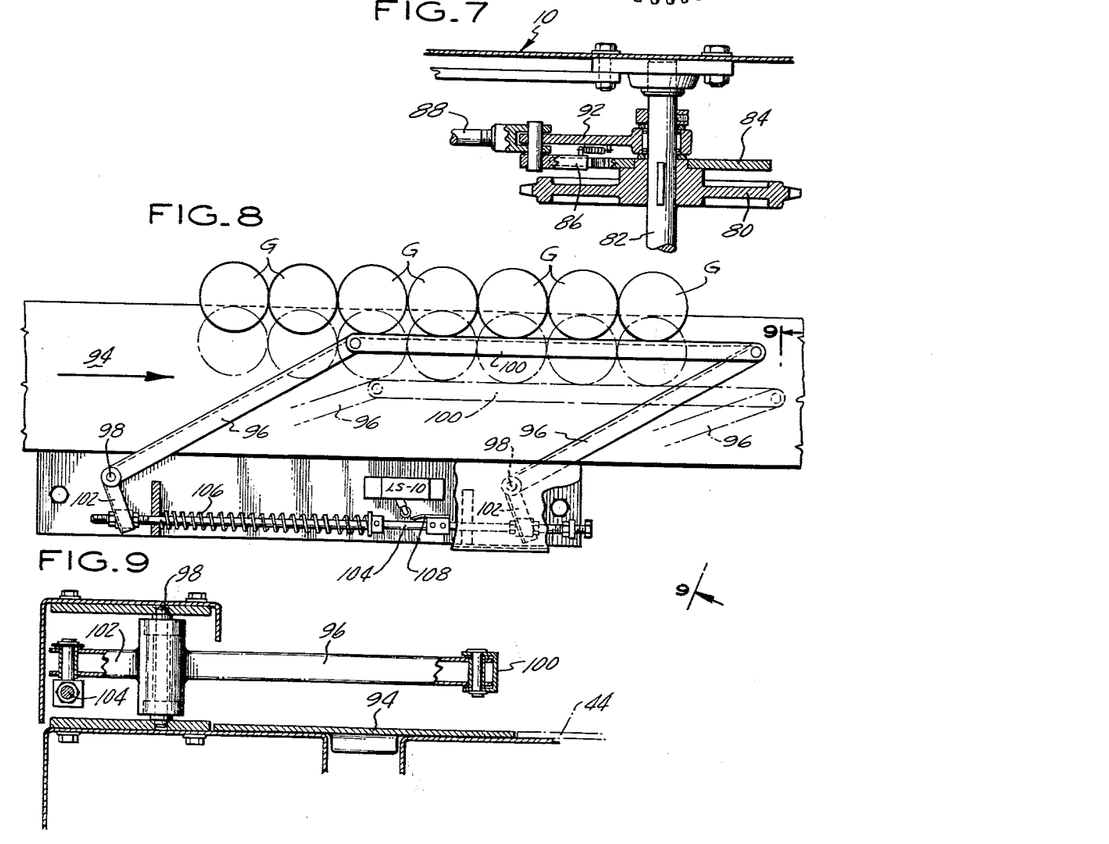
FIG. 7 is a cross-sectional view taken as indicated by the line 7—7 of FIG. 6.
FIG. 8 is a top plan view of the actuating mechanism for the switch forming a part of the control means for the sweep bar drive.
FIG. 9 is an enlarged vertical cross-sectional view taken as indicated by the line 9—9 of FIG. 8.
Figure 10:
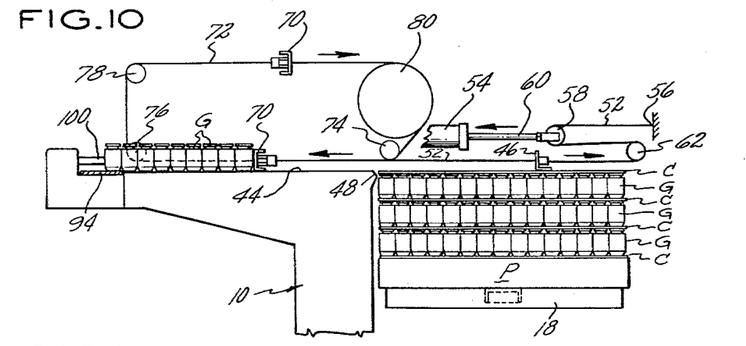
FIG. 10 is a schematic illustration showing the sweep bar in operation to sweep a tier of articles off the platform or deadplate while the pusher bar is being returned to its retracted position so as to engage and thrust another tier of articles onto the deadplate.

Included in the control means for the fluid motor 90 is a switch operating mechanism shown in FIG. 8 and which is located over a motor driven conveyor 94. The conveyor 94 is of the endless belt type and is operated continuously during operation of the depalletizing machine. This conveyor moves the articles of glassware which have been thrust from the deadplate 44 away from the deadplate area and away from in front of the remaining portion of the tier of articles thereon. The direction of movement of the conveyor 94 is transverse with respect to the machine frame 10 or parallel with respect to the tier rows.

Figure 5:
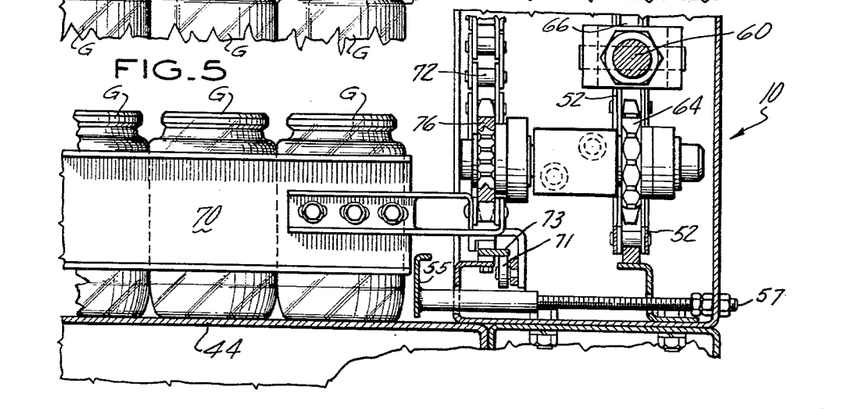
FIG. 5 is another enlarged transverse sectional view taken as indicated by the line 5—5 of FIG. 2.

The said switch operating mechanism includes a pair of parallel arms 96, 96 which are the longer arms of bell cranks pivotally supported on the frame 10 at 98, 98. The extending ends of said arms are pivotally connected to a crossbar 100 which is disposed over the conveyor 94 to be engaged by articles of glassware G, G being thrust from the deadplate onto the conveyor. When the crossbar 100 is so engaged by the moving glassware articles, the crossbar and parallel arms are moved from the full line position of FIG. 8 into the broken line position theerof, this causing swinging movement of the shorter arms 102, 102 of the bell cranks. The extending ends of the said shorter arms are connected with a switch actuating rod 104 to shift it axially. The rod 104 is biased in one axial direction (toward the right as viewed in FIG. 8) by a spring 106, and when the bar 100 is engaged to depress the parallelogram switch actuator, the rod is shifted toward the left. This causes a cam 108 connected to the said rod to engage a limit switch LS–10 which will make the cylinder 90 retract the piston rod 38. The said limit switch will remain engaged until the conveyor has moved the glassware articles thereon from in front of the bar 100. When this has been done, the spring 106 will return the switch operating linkage to the full line position and the said limit switch will be released to return to its normal position which permits feeding movement or a stroke of the fluid motor 90 to advance the sweep bar and to thrust another row of the articles onto the conveyor. This will be more fully explained in the description of the electrical control. However, it is to be noted at this point that each sweep bar 70 is held in an erect position by means of a roller 71 engaging the bottom of a longitudinal cam 73 (FIG. 5). This prevents the sweep bars from tilting until the glassware has all been swept from the deadplate.

Electrical control and operation

Figure 13:
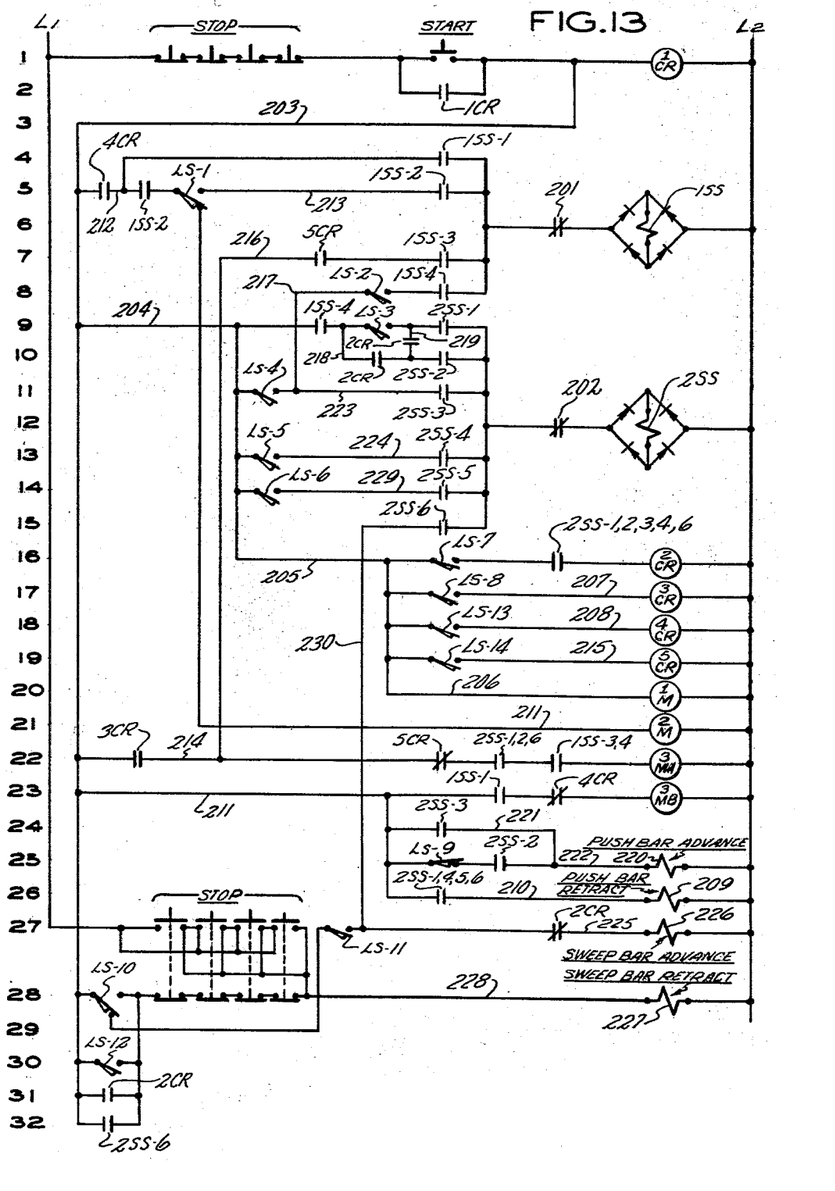
FIG. 13 is a wiring diagram showing the electrical control elements utilized in the depalletizing machine.

The depalletizing machine of this invention is electrically operated by conventional elements arranged in circuits as shown in FIG. 13. Included among these elements are a pair of stepping switches which are respectively operated by the bridged solenoids 1SS and 2SS. Each time a stepping switch solenoid is energized, the stepping switch is advanced one step. All of the contacts of each stepping switch are normally open, but they are so arranged as to be closed in one or more steps of the switch. In the circuit diagram, the stepping switch contacts are shown normally open and are designated by the step at which the said contacts will be closed. For example, contacts designated 1SS–1 will be closed in the first step of the first stepping switch, and contacts that may be designated 2SS–1, 2, and 3 will be closed in the first, second and third steps of the No. 2 or second stepping switch.

The No. 1 stepping switch operated by the solenoid 1SS has four steps and thus will repeat each 4th step, and the No. 2 stepping switch operated by the solenoid 2SS has six steps and will repeat each 6th step. Associated with each stepping switch solenoid is a pair of normally closed contacts which open each time the solenoid is energized, and these contacts are connected in series with the associated solenoid so as to interrupt or pulse the solenoid operation. The normally closed contacts associated with the solenoid 1SS are designated by the reference number 201 and the normally closed contacts associated with the solenoid 2SS are designated by the reference number 202.

Figure 12:
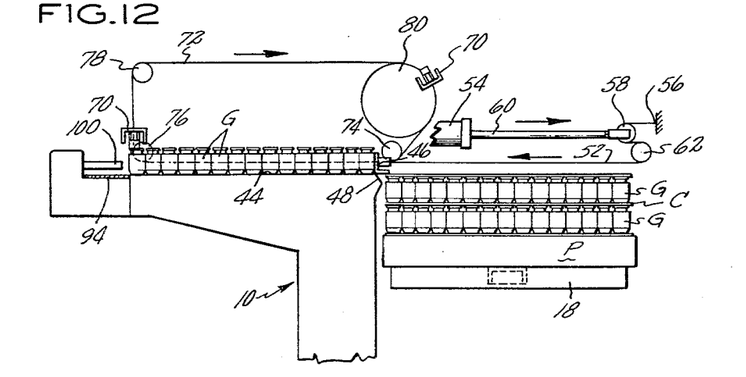
FIG. 12 is similar to FIGS. 10 and 11, but it illustrates the pusher bar advanced to deliver a tier onto the deadplate.

Before starting automatic operation of the machine, each of the aforementioned stepping switches is placed manually, if necessary, at its first step, a loaded pallet P is placed on the pallet conveyor 12, and any articles from a preceding pallet are removed from the machine. Further, the elevator 18 should be placed in its bottom position, the pusher bar 46 should be in its retracted position, and the sweep bars 70, 70 placed in the "home" position, such as shown in FIG. 12. If necessary, all of this can be done manually by crank means or the like (not shown).

To start operation, the operator depresses a start switch in line 1. (The horizontal lines of the circuit diagram of FIG. 13 are designated from top to bottom by the numerals 1 to 32 for convenient reference.) Included in line 1 are a plurality of normally closed stop switches which are ganged with similar switches in lines 27 and 28. Any one or more of these stop switches can be a manually operable switch for operator control and the remaining stop switches can be emergency stops which are operated automatically by the machine due to jamming or other malfunction. When the start switch in line 1 is closed, a circuit is completed in line 1 between the power lines L1 and L2, and this circuit includes a control relay 1CR which is thereby energized. When the relay 1CR is energized, it closes its contacts in line 2 to latch around the start switch so that the said control relay will remain energized until one of the stop switches is opened.

Further, with the closing of the start switch, a motor starting relay 1M is energized in line 20, this relay being in a circuit which includes the conductors 203, 204, 205 and 206. The starting relay 1M closes the start switch in the motor (not shown) for the take-away conveyor 94. The conveyor 94 will operate continuously until one of the stop switches in line 1 is opened.

Figure 11:
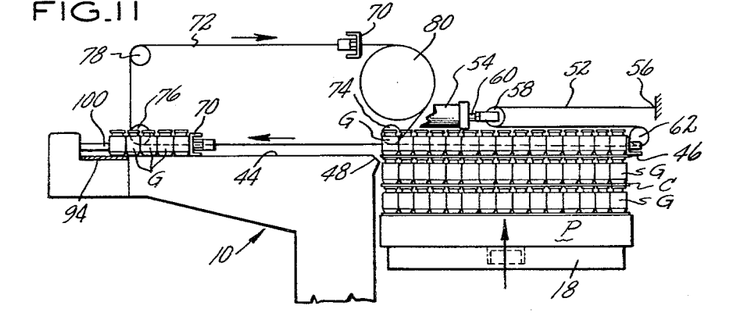
FIG. 11 is similar to FIG. 10, but it shows the pusher bar fully retracted and the sweep bar more advanced.

Also with the closing of the start switch, a control relay 2CR in line 16 is energized through a normally open but now closed limit switch LS–7 and through the now closed switch contacts 2SS. The limit switch LS–7 and the said stepping switch contacts are in the conductor 205 at line 16 as is the control relay 2CR. The normally open limit switch LS–7 is held closed at this time by the left-hand sweep bar 70 in FIG. 12 being substantially in the position shown therein. This is the "home" position for the sweep bars indicating that they are clear of the pallet P and the deadplate 44. Another relay 3CR in a conductor 207 at line 17 is energized through a normally open but now closed limit switch LS–8, the circuit being completed through the conductors 203, 204, 205, 206 and 207. The normally open limit switch LS–8 is held closed by the pusher bar 46 being in its retracted position as shown in FIGS. 2 and 11. Still another relay 4CR is closed in a conductor 208 at line 18 through a normally open but now closed limit switch LS–13, the circuit being completed through the conductors 203, 204, 205, 206 and 208. The limit switch LS–13 is held closed by the elevator 18 being in its down position.

In addition to the foregoing, a solenoid 209 in a conductor 210 at line 26 is energized through stepping switch contacts 2SS, these being closed at this time because the second stepping switch is in its first step. The circuit to the solenoid 209 is completed through the conductors 203, 211 and 210. The solenoid 209 operates a three-position control valve (not shown) to place it in position so that the pusher bar operating air cylinder 54 will thrust its piston rod 60 toward the left as viewed in FIG. 2, this being the retracted position for the pusher bar. Whenever the said control valve is not operated by a solenoid, it takes a neutral position to prevent any movement of the pusher bar. The solenoid 209 is energized at this time for assurance that the pusher bar will remain in the retracted position.

Thus, immediately that the start switch is closed, the control relays 1CR, 2CR, 3CR and 4CR are energized as is the relay 1M for starting the take-away conveyor and the solenoid 209 for holding the pusher bar in the retracted position. The relay 1CR and the take-away conveyor starting relay 2M remain energized throughout the operation of the machine. The relay 2CR will remain energized until the limit switch LS–7 is opened by movement of the sweep bars 70, 70. The relay 3CR will remain energized until the pusher bar is advanced to open the limit switch LS–8, and the relay 4CR will remain energized until the elevator 18 is moved upwardly to open the limit switch LS–13.

The next step of operation is movement of the loaded pallet on the conveyor 12 into the depalletizing machine. This is accomplished by energizing the motor 14 which drives the said conveyor. The pallet conveyor motor is started by energizing a relay 2M in line 21, this relay being energized in a circuit which includes the conductor 211 and a conductor 212 connected to the conductor 203. In the conductor 212 at line 5 there are normally open contacts 4CR and 1SS. The contacts 4CR are closed with closing of the start switch to energize the relay 4CR, and the contacts 1SS are closed by energizing the stepping switch solenoid 1SS to place the first stepping switch at its second step. The solenoid 1SS is energized with closing of the start switch to advance to the second step through contacts 1SS in line 4, the stepping switch having been initially at the first step. Thus, immediately after closing the start switch, the stepping switch solenoid 1SS is pulsed to advance the first stepping switch to the second step. The circuit to the conveyor motor starting relay 2M also includes the limit switch LS–1 in line 5 which is shown in its normal position to complete connection between the conductors 211 and 212. The limit switch LS–1 will remain in this position until a loaded pallet engages the switch actuator 20 as previously described.

When the first stepping switch is in its second step as described, the pallet conveyor motor will drive the conveyor 12 until the loaded pallet P engages the actuator 20 to shift the limit switch LS–1 from the position shown in FIG. 13 into contact in line 5 with a conductor 213. This opens the circuit to the pallet conveyor starting relay 2M and the conveyor motor 14 will be de-energized and the pallet conveyor 12 will stop. Also, with shifting of the limit switch LS–1, the stepping switch solenoid 1SS will again be pulsed to advance the first stepping switch to the third step, this being accomplished through the contacts 1SS in line 5. After the pulsing, both sets of contacts 1SS in line 5 are opened so that the pallet conveyor motor cannot again be energized until a cycle has been completed of the first stepping switch to the second step.

When the first stepping switch reaches its third position, the contacts 1SS in line 22 are closed as are the contacts 2SS, the second stepping switch being still in step 1. This completes a circuit to the elevator motor starting relay 3MA in line 22 or conductor 214. The circuit also includes the now closed relay contacts 3CR, and the normally closed relay contacts 5CR. The relay 3MS when energized starts the reversible elevator motor 40 into operation in a direction which raises the elevator. The elevator motor will continue to operate until the relay 5CR is energized. When the elevator is raised, the limit switch LS–1 will return to its normal position, but the pallet conveyor motor cannot again be energized because of open contacts 1SS in line 5.

The upward travel of the elevator is to be stopped when the bottom of the upper tier of glassware is in the plane of the deadplate 44. This position of the elevator is signalled by the closing of a normal open limit switch LS–14 in line 19. The limit switch LS–14 may be operated by the pallet or elevator, or it may be arranged to be operated by a photocell unit having its beam broken when the upper tier of glassware is in the proper position. Immediately the limit switch LS–14 is closed, the control relay 5CR in conductor 215 of line 19 is energized and this will open the normally closed contacts 5CR in line 22 to de-energize the elevator motor relay 3MA.

A second set of contacts operated by the control relay 5CR are closed in a conductor 216 at line 7 and the contacts 1SS in said line are closed because the first stepping switch is in the third step. This pulses the stepping switch solenoid 1SS in a circuit which includes the conductors 214 and 216. Accordingly, the first stepping switch is placed in its fourth position. When this is done, the normally open contacts 1SS at line 8 are closed in a conductor 217 so that the stepping switch solenoid 1SS can receive another impulse whenever a limit switch LS–2 in line 8 is closed by the pallet reaching the upper level of desired elevation. Accordingly, the first stepping switch is left in the fourth position whereby the contacts 1SS in line 22 remains closed so that the elevator raise relay 3MA can be energized to raise the elevator in increments corresponding to the number of tiers thereon. Each increment of elevator movement will occur provided the pusher bar is retracted to energize the control relay 3CR and provided further that the relay 5CR is not energized by the elevator reaching a level to close the limit switch LS–14 and provide also that the sweep bar 70 is not in the path of the elevating pallet as determined by the switch contacts 2SS in line 22 being in the third, fourth and fifth positions.

The next step in the operation is to extend or advance the pusher bar to move the top layer or tier of glassware from the pallet onto the deadplate. This, of course, occurs after the elevator has stopped at the end of its initial upward travel, and as previously mentioned, at this time the first stepping switch advances from step 3 to step 4. With the first stepping switch in step 4, the contacts 1SS–4 in line 9 are closed, and a circuit is completed to the solenoid 2SS for the second stepping switch through the now closed contacts 2CR in conductors 218 and 219 and through the closed contacts 2SS in line 9, the said circuit being connected with the conductor 204. This pulses the solenoid 2SS from step 1 to step 2 to close the contacts 2SS in conductor 218 so that the solenoid 2SS is again pulsed to bring the second stepping switch to step 3. Movement of the second stepping switch through step 2 into step 3 can be accomplished if the sweep bars 70, 70 are "home" to hold the limit switch LS–7 closed so that the relay 2CR remains energized to keep the contacts 2CR closed in conductors 218 and 219. When the second stepping switch is in its third position, its contacts 2SS in line 26 to the pusher bar retract solenoid 209 are opened to de-energize that solenoid. At the same time, the contacts 2SS in line 24 are closed to energize the pusher bar advance solenoid 220 in line 25. The circuit to the solenoid 220 is completed through the conductors 211, 221 and 222. When the solenoid 220 is energized, the valve for the pusher bar actuating cylinder 54 is operated to thrust the air cylinder piston rod 60 toward the right which advances the pusher bar.

When the pusher bar has been fully extended to its advanced position to move the top tier onto the deadplate, it will engage and close a limit switch LS–4 in line 11 and conductor 223. Thus, the solenoid 2SS is pulsed because of a circuit completed through the now closed contacts 2SS in line 11 and this advances the second stepping switch to its fourth position. At the fourth position of the second stepping switch, the contacts 2SS are closed in line 26 to again energize the pusher bar retract solenoid 209 while the contacts 2SS in line 24 are open to de-energize the pusher bar advance solenoid 220. Accordingly, the pusher bar is retracted to the position wherein it engages and closes the limit switch LS–8 in line 17 to again energize the control relay 3CR.

However, before the pusher bar is fully retracted, and in keeping with the high speed operation, it is desirable to start movement of the sweep bars 70, 70 so that the glassware on the deadplate can be engaged and moved toward the take-away conveyor. Therefore, as the pusher bar 46 retracts, and when it is clear of the path of the sweep bars, is will engage and close a limit switch LS–5 in line 13 and conductor 224. This completes a circuit to the solenoid 2SS through the now closed contacts 2SS so that the said solenoid is pulsed to put the second stepping switch into its fifth position.

When the second stepping switch reaches its fifth position, its contacts 2SS in line 16 open to de-energize the control relay 2CR and this causes the relay contacts 2CR in line 27 and conductor 225 to resume the normally closed condition. This completes a circuit to a solenoid 226 which when energized operates a two-position control valve (not shown) to extend the piston rod 88 in the fluid cylinder 90 and advance the sweep bars 70, 70. Included in the circuit to the solenoid 226 is a normally open limit switch LS–11 which is held closed by the retracted sweep bar piston rod 88. The circuit to the solenoid 226 also includes the normally closed limit switch LS–10 in line 28 which is opened only by glassware on the take-away conveyor 94. The limit switch LS–10 is the one that is operated by the parallelogram operator that was previously described.

In order to bring the rear sweep bar into contact with the rear row of articles on the deadplate, it is necessary to hitch feed the said sweep bar by several full strokes of the fluid motor 90. When the fluid motor piston is fully extended at the end of a stroke, it engages and closes a limit switch LS–12 in line 30 to complete a circuit to a sweep bar retract solenoid 227 in line 28 and in conductor 228. This circuit includes the normally closed emergency stop switches in line 28. The circuit to the sweep bar advance solenoid 226 will have been opened with the opening of the limit switch LS–11 in line 27 when the sweep bar advancing piston leaves its retracted position. Thus, the fluid motor 90 will reciprocate its piston 88 to drive the ratchet 84 in a clockwise direction and thus to advance the sweep bars 70, 70 clockwise with the chains 72 until the nearest sweep bar engages the rearmost row in the tier on the deadplate.

When the sweep bar engages the glassware on the deadplate as a result of full stroke operation of the fluid motor 90, it is desirable to retract the sweep bar feed cylinder piston so that further advancing movement thereof will advance the ware on the deadplate until at least one row has been thrust therefrom onto the take-away conveyor 94. This is accomplished through a limit switch LS–6 in line 14 which is engaged and closed by the sweep bar as it engages the glassware on the deadplate. The now closed limit switch LS–6 in conductor 229 completes a circuit to the stepping switch solenoid 2SS through the now closed contacts 2SS in line 14. This pulses the second stepping switch and advances it to its sixth position. When the second stepping switch reaches its sixth position, its contacts 2SS in line 32 are closed to complete a circuit through the stop switches in line 28 to the sweep bar retract solenoid 227, and thus, the sweep bar is fully retracted. When the sweep bar is fully retracted, the limit switch LS–11 in line 27 is closed thereby to energize the sweep bar advance solenoid 226 whereupon the sweep bar advances to thrust glassware from the deadplate onto the conveyor 94.

While the sweep bar is thus being retracted, the limit switch LS–10 in line 28 will be in the position shown in FIG. 13 and when the sweep bar fluid motor is fully retracted, the limit switch LS–11 in line 27 is closed and this causes the solenoid 2SS to be pulsed through a conductor 230 which includes the now closed contacts 2SS–6 in line 15. This puts the second stepping switch into its first position. With the second stepping switch in its first position, the sweep bars are advanced under control of the parallelogram operated limit switch LS–10.

Whenever there is no glassware on the conveyor 94 to shift the limit switch LS–10, the said limit switch resides in the position shown in FIG. 13 to energize the sweep bar advance solenoid 226 whenever the limit switch LS–11 is closed by a retracted fluid motor 90. When there is ware on the conveyor 94 to shift the limit switch LS–10, the circuit to the sweep bar advance solenoid is opened thereby and the sweep bar retract solenoid 227 is energized in line 28 by closing the limit switch LS–10 with the contacts in the conductor 228. Therefore, the sweep bar will be advanced in hitch feed movements only when glassware has been carried by the conveyor 94 away from the parallelogram switch actuator, and the sweep bar drive motor 90 will be retracted whenever there is glassware on the conveyor engaging and shifting the limit switch LS–10 from its normal position.

During operation of the sweep bar as described to thrust glassware onto the take-away conveyor, it is desirable to raise the pallet so that the pusher bar can supply another tier to the deadplate whenever the first tier is exhausted. It is obviously necessary to have both the sweep bar and pusher bar clear of the upward path of the pallet before it is raised.

The raise elevator starter relay 3MA will be energized only if the pusher bar is fully retracted so as to energize the control relay 3CR, and the motor relay 3MA will also only be energized if the stepping switch 2SS is in its first, second, or sixth position and if the first stepping switch is in its fourth position. Such positions of the second stepping switch indicate that the sweep bar is not in the process of full stroke take-up movements and it is, therefore, out of the way of a raised pallet, and such position of the first stepping switch indicates that a pallet is in the machine and has been initially elevated and that the control relay 5CR is not energized due to glassware being at an elevation even with the deadplate.

Before pushing the second layer of glassware onto the deadplate or before any subsequent layer is pushed, it is desirable that the ware on the deadplate in the preceding tier be advanced far enough along the deadplate to provide room for the succeeding tier. This is accomplished by the sweep bar opening a normally closed limit switch as it moves the tier off the deadplate. As the sweep bar passes the limit switch, indicating that space is available on the deadplate, the pusher bar can proceed.

More specifically, as the sweep bar moves across the deadplate to advance a tier, it closes limit switch LS–3 to cause the second stepping switch to advance from its first to its second position. That is, the circuit to the solenoid 2SS is completed in conductor 204 through the closed contacts 1SS and the closed contacts 2SS in line 9. With the second stepping switch in its second position, the extended pusher bar solenoid 220 is energized in line 25 through the closed limit switch LS–9 and the now closed stepping switch contacts 2SS. However, the pusher bar cannot be fully advanced if there is not room for the new tier on the deadplate. That is, if there is glassware covering a portion of the deadplate (for example, more than sixteen inches from the take-away conveyor 94), the limit switch LS–9 will be engaged and opened. This will de-energize the pusher bar advance solenoid 220 and stop movement of the pusher bar. Ordinarily, the glassware and sweep bar will have passed the position permitting the limit switch LS–9 to resume its normal position in ample time for the pusher bar to be fully advanced without any pause in its movement.

When the sweep bar reaches its "home" position, it engages and closes the limit switch LS–7 to energize the control relay 2CR in line 16 through the now closed stepping switch contacts 2SS. When the relay 2CR is energized, its contacts in line 10 and conductor 218 are closed to complete a circuit through the contacts 2SS in line 10 to the stepping switch solenoid 2SS. The said solenoid is then pulsed and the second stepping switch moves into its third position. As the second stepping switch reaches its third position, the pusher bar advancing solenoid 220 is again energized through the now closed contacts 2SS in line 24, and the pusher bar will proceed to the fully advanced position. Then, the pusher bar is retracted as has previously been described.

The aforedescribed movement of each tier from the loaded pallet, accompanied by elevation of the pallet for each tier, is continued until the last tier or layer of glassware on the pallet is pushed onto the deadplate. Then, the elevator 18 is lowered to its original position. This is accomplished by arranging the limit switch LS–2 in line 8 and conductor 217 so that it will be engaged and closed by the elevator at the upper limit of its travel for removal of the bottom tier. The closing of the limit switch LS–2 pulses the solenoid 1SS to move the first stepping switch from the fourth to the first position. The circuit for pulsing the solenoid 1SS is completed through the limit switch LS–4 in line 11 which is engaged and closed by the pusher bar being fully advanced. The elevator motor 40 is energized to lower the elevator by a starting relay 3MB in line 23 and conductor 211 through the normally closed contacts 4CR and the now closed contacts 1SS in line 23.

The elevator continues its downward travel with the empty pallet until it engages and closes the limit switch LS–13 in line 18 to energize the control relay 4CR. The normally closed contacts 4CR in line 23 are then opened to de-energize the elevator lowering relay 3MB.

At the same time, the contacts 4CR in line 5 are closed to complete a circuit to the first stepping switch solenoid 1SS through the now closed contacts 1SS in line 4. This moves the first stepping switch from its first to its second position, and the depalletizing machine is now ready to start another cycle of operation with a new loaded pallet.

The empty pallet on the lowered elevator has insufficient weight to depress the switch actuator 20, and thus when the pallet delivery conveyor 12 is started into operation, a loaded pallet thereon will engage and thrust the empty pallet over the switch actuating roller 24 and over the stop 22 onto the pallet discharge conveyor 16.

The invention claimed is:

1. Apparatus for removing articles arranged in parallel rows in horizontal tiers stacked on a pallet and comprising an elevator for supporting the pallet with the upper tier at a selected elevation, a horizontal deadplate disposed adjacent said upper tier, a pusher bar movable from a retracted to an advanced position while engaging the rear row in the upper tier to move the entire tier onto the deadplate, means for reciprocating the said pusher bar between its retracted and advanced positions, a sweep bar engageable with the rear row in the tier on the deadplate to advance the tier across the deadplate and thereby to thrust articles off the deadplate in successive rows from the front of the tier, control and operating means for engaging the sweep bar with the tier only after the pusher bar has moved toward retracted position and for advancing the tier in increments of movement of such extent as to thrust a selected number of rows from the deadplate for each increment, and control means for raising said elevator to support each tier in succession at said selected elevation only after said pusher bar has been advanced and then returned to its retracted position.

2. Apparatus for removing articles arranged in parallel rows in horizontal tiers stacked on a pallet and comprising an elevator for supporting the pallet with the upper tier at a selected elevation, a horizontal deadplate disposed adjacent said upper tier, a pusher bar movable from a retracted to an advanced position while engaging the rear row in the upper tier to move the entire tier onto the deadplate, means for reciprocating the said pusher bar between its retracted and advanced positions, a sweep bar engageable with the rear row in the tier on the deadplate to advance the tier across the deadplate and thereby to thrust articles off the deadplate in successive rows from the front of the tier, control and operating means for engaging the sweep bar with the tier only after the pusher bar has moved toward retracted position and for advancing the tier in increments of movement of such extent as to thrust a selected number of rows from the deadplate for each increment, control means for the pusher bar reciprocating means responsive to movement of the tier on the deadplate to prevent movement of the pusher bar from retracted position until there is room for a new tier on the deadplate and to arrest advancing movement of the pusher bar until a preceding tier has been moved to a predetermined position, and control means for raising said elevator to support each tier in succession at said selected elevation in timed relationship with the operation of the said pusher bar.

3. Apparatus for removing articles arranged in parallel rows in horizontal tiers stacked on a pallet and comprising an elevator for supporting the pallet with the upper tier at a selected elevation, a horizontal deadplate supported adjacent said upper tier, a pusher bar movable from a retracted to an advanced position while engaging the rear row in the upper tier to move the entire tier onto the deadplate, means for moving said pusher bar from its retracted to its advanced position and for then returning it to the retracted position, a sweep bar engageable with the rear row in the tier on the deadplate to advance the tier across the deadplate and thereby to thrust articles off the deadplate from the front of the tier in successive rows, a conveyor disposed adjacent the deadplate to remove articles thrust therefrom in a direction generally parallel to the parallel rows of the tier, means for advancing the sweep bar in increments of movement of an extent necessary to thrust at least one row onto the conveyor for each movement of the sweep bar, electrical control means for said sweep bar advancing means including a parallelogram switch actuator engageable and operable by articles on the conveyor until they have been removed from in front of the tier to prevent further advance of the sweep bar, and control means for raising said elevator to support each tier in succession at said selected elevation in timed relationship with the operation of the said pusher bar.

4. Apparatus for removing articles arranged in parallel rows in horizontal tiers stacked on a pallet and comprising an elevator for supporting the pallet with the upper tier at a selected elevation, a horizontal deadplate disposed adjacent said upper tier, a pusher bar movable from a retracted to an advanced position while engaging the rear row of the upper tier to move the entire tier onto the deadplate, means for reciprocating the pusher bar between its retracted and advanced positions, a sweep bar engageable with the rear row in the tier on the deadplate to advance the tier across the deadplate and thereby to thrust articles off the deadplate in successive rows from the front of the tier, a conveyor for receiving articles thrust from the deadplate and for moving them generally parallel to the rows in the tier, control and operating means for engaging the sweep bar with the tier to advance it in increments of movement of such extent as to thrust a selected number of rows from the deadplate for each increment, said control and operating means including a parallelogram switch actuator engageable and operable by articles on the conveyor until they have been removed from in front of the tier to prevent further advance of the sweep bar, and control means for raising said elevator to support each tier in succession at said selected elevation in timed relationship with operation of the said pusher bar.

5. The apparatus defined in claim 4 and wherein the control means for raising said elevator to support each tier in succession at said selected elevation includes means for preventing upward movement of the elevator until the pusher bar is in retracted position.

6. The apparatus defined in claim 4 including control means for the pusher bar reciprocating means and which is responsive to movement of the tier on the deadplate to prevent movement of the pusher bar from retracted position until there is room for a new tier on the deadplate and to arrest advancing movement of the pusher bar until a preceding tier has been moved to a predetermined position.

7. In an apparatus for removing articles from a carrier, the combination comprising an elevator for raising and lowering such a carrier, a driven conveyor for moving a loaded carrier into position on the elevator, control means for the conveyor and elevator including a switch having an actuator engageable by the carrier at said position to be depressed only due to the loaded weight of the carrier and thereby to operate said switch so as to stop said conveyor and to raise said elevator, a stop engageable by a carrier at said position only when said switch actuator is depressed to prevent further conveyor movement of the carrier, means for removing articles from the elevated carrier, said control means also including means for lowering said elevator when the carrier is empty to return it to said position, and said control means including additional means operable by the return of the carrier and elevator to again start operation of said conveyor whereby a loaded carrier on the conveyor will be moved to said position and remove the preceding empty carrier therefrom.

8. Apparatus for removing articles arranged in parrallel rows in horizontal tiers stacked on a pallet and comprising an elevator for supporting the pallet with the upper tier at a selected elevation, a conveyor disposed at said elevation to remove articles thrust from the tier, means operable at said elevation to engage the rear row in the upper tier to move the tier off the pallet and to move the articles in rows onto said conveyor, drive means for said moving means operable to move the tier in increments sufficient to move at least one row at a time onto said conveyor, and electrical control means for said drive means including a parallelogram switch actuator engageable and operable by articles on the conveyor until they have been removed from in front of the tier to prevent further advance of the moving means.

References Cited by the Examiner

UNITED STATES PATENTS

| | | | |
|---|---|---|---|
| 2,596,339 | 5/52 | Lufkin | 214—300 X |
| 2,727,642 | 12/55 | Haycock | 214—309 |
| 2,774,489 | 12/56 | Guigas. | |
| 2,994,444 | 8/61 | Peterson. | |
| 3,056,515 | 10/62 | Anderson. | |
| 3,107,794 | 10/63 | Bechtold. | |
| 3,113,683 | 12/63 | Von Gal. | |

HUGO O. SCHULZ, *Primary Examiner.*

MORRIS TEMIN, *Examiner.*